United States Patent
Boyer et al.

(10) Patent No.: US 9,940,323 B2
(45) Date of Patent: Apr. 10, 2018

(54) TEXT CLASSIFIER OPERATION

(71) Applicant: International Business Machines Corporation, Armonk, NY (US)

(72) Inventors: John M. Boyer, Victoria (CA); Kshitij P. Fadnis, Dublin, OH (US); Dinesh Raghu, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/207,635

(22) Filed: Jul. 12, 2016

(65) Prior Publication Data

US 2018/0018320 A1     Jan. 18, 2018

(51) Int. Cl.
*G06F 17/27* (2006.01)
*G06F 17/24* (2006.01)
*G06N 99/00* (2010.01)

(52) U.S. Cl.
CPC .......... *G06F 17/2785* (2013.01); *G06F 17/24* (2013.01); *G06F 17/278* (2013.01); *G06N 99/005* (2013.01)

(58) Field of Classification Search
CPC .................................................. G06F 17/2785
See application file for complete search history.

(56) References Cited

U.S. PATENT DOCUMENTS

| | | | |
|---|---|---|---|
| 5,371,807 A * | 12/1994 | Register | G06F 17/30707 382/159 |
| 5,924,105 A * | 7/1999 | Punch, III | G06F 17/277 704/7 |
| 6,278,996 B1 | 8/2001 | Richardson et al. | |
| 7,987,188 B2 | 7/2011 | Neylon et al. | |
| 8,275,762 B2 | 9/2012 | Gupta et al. | |
| 8,335,683 B2 * | 12/2012 | Acero | G06F 17/2715 704/246 |
| 8,843,470 B2 | 9/2014 | Li et al. | |
| 8,898,140 B2 | 11/2014 | Cooper et al. | |
| 8,954,360 B2 | 2/2015 | Heidasch et al. | |
| 2002/0169595 A1 * | 11/2002 | Agichtein | G06F 17/2705 704/9 |

(Continued)

OTHER PUBLICATIONS

Harabagiu, Sanda M., et al. "Falcon: Boosting knowledge for answer engines." (2000).*

(Continued)

*Primary Examiner* — Brian L Albertalli
(74) *Attorney, Agent, or Firm* — Stephen R. Tkacs; Stephen J. Walder, Jr.; William J. Stock (57) ABSTRACT

A mechanism is provided in a data processing system for text classification. A domain terms selector component, executing on a processor of the data processing system, receives an input text. A domain terms selector component executing on a processor of the data processing system identifies at least one domain term in the input text. A domain terms replacer component executing on a processor of the data processing system replaces the at least one identified domain term in the input text with a corresponding replacement term to form a revised input text. A text classifier component configured with a trained text classifier machine learning model classifies the revised input text to form a class determination.

20 Claims, 5 Drawing Sheets

(56) References Cited

U.S. PATENT DOCUMENTS

| | | | |
|---|---|---|---|
| 2004/0133418 A1* | 7/2004 | Turcato | G06F 17/241 |
| | | | 704/9 |
| 2009/0125805 A1* | 5/2009 | Ananthanarayanan | |
| | | | G06F 17/2211 |
| | | | 715/255 |
| 2009/0287678 A1 | 11/2009 | Brown et al. | |
| 2010/0114879 A1* | 5/2010 | Zhong | G06F 17/278 |
| | | | 707/723 |
| 2011/0066587 A1 | 3/2011 | Ferrucci et al. | |
| 2011/0125734 A1 | 5/2011 | Duboue et al. | |
| 2011/0246486 A1* | 10/2011 | Peng | G06F 17/2775 |
| | | | 707/750 |
| 2011/0289025 A1 | 11/2011 | Yan et al. | |
| 2012/0179453 A1* | 7/2012 | Ghani | G06F 17/27 |
| | | | 704/9 |
| 2012/0253793 A1* | 10/2012 | Ghannam | G06F 17/2785 |
| | | | 704/9 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0172899 A1 | 6/2014 | Hakkani-Tur et al. | |
| 2015/0186355 A1* | 7/2015 | Baldwin | G06F 17/273 |
| | | | 704/9 |
| 2016/0062985 A1* | 3/2016 | Epstein | G06F 17/30707 |
| | | | 704/9 |
| 2017/0031894 A1* | 2/2017 | Bettersworth | G06F 17/277 |

OTHER PUBLICATIONS

List of IBM Patents or Patent Applications Treated as Related, Jul. 26, 2016, 2 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Severyn, Aliaksei, "Modelling Input Texts: From Tree Kernels to Deep Learning", PhD Dissertation, University of Trenton, Apr. 2015, 199 pages.

Yuan, Michael J., "Watson and healthcare, How natural language processing and semantic search could revolutionize clinical decision support", IBM developerWorks, IBM Corporation, Apr. 12, 2011, 14 pages.

Mishra, Shlok K. et al., "A Support Vector Machine Based System for Technical Question Classification", Proceedings of the Third International Conference on Mining and Intelligence and Knowledge Exploration, MIKE 2015, Hyderabad, India, Dec. 9-11, 2015, pp. 640-649.

* cited by examiner

TEXT CLASSIFIER OPERATION

BACKGROUND

The present application relates generally to an improved data processing apparatus and method and more specifically to mechanisms that mitigate bias in input text to be classified by the operation of a text classifier.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples of QA systems are the IBM Watson™ system available from International Business Machines (IBM®) Corporation of Armonk, N.Y., Siri® from Apple®, and Cortana® from Microsoft®. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system for text classification. The method comprises receiving, by a domain terms selector component executing on a processor of the data processing system, an input text. The method further comprises identifying, by a domain terms selector component executing on a processor of the data processing system, at least one domain term in the input text. The method further comprises replacing, by a domain terms replacer component executing on a processor of the data processing system, the at least one identified domain term in the input, text with a corresponding replacement term to form a revised input text. The method further comprises classifying, by a text classifier component configured with a trained text classifier machine learning model, the revised input text to form a class determination.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

A cognitive question and answering system, or QA system, is a computer system that receives a question in natural language or query format and returns an answer or answers. The service or method invoked to answer the question often depends on classification of text, the text being a question (whether expressed interrogatively or not) or a passage or portion of a document containing an answer or evidence supporting an answer. For example, the question "What is the current stock price of XYZ corporation?" (or "Tell me the current stock price of XYZ corporation") is best answered by a real-time stock price service. By comparison, the same service cannot answer the question "Who was elected U.S. president in 2008?" Instead, that question could be answered by a knowledge service that has access to a corpus of unstructured textual documents in which the answers to such questions can be found.

A text classifier is a software module that receives a text and returns an identifier of a class indicating what type of text was received. A software system may map each class to one or more services that are to be invoked to process texts in that class. For instance, the software system may map each question class to one or more services that may be used to answer questions in that question class.

The term ground truth, as applied to a machine learned text classifier, refers to a set consisting of pairs of texts and their corresponding classes. Some subset of the ground truth can be used for training, leaving its complement to serve as a test set. A machine learning technique is used to create a statistical model for mapping texts to classes. As an example, the question "What is the near term outlook of the Singapore dollar?" may be associated with the "Sentiment" question type; the question "Who was the president of Singapore in 2010?" may be associated with the "Factoid" question type; and, the question "What is the procedure for becoming qualified to buy junk bonds in Singapore?" may be associated with the "Description" question type.

An independent cloud service or other software solution may be provided that enables users to train a machine learned text classifier. Then, either the same or a different cloud service or other software solution may be provided that enables users to operate, or use, the trained classifier service or other software solution. As classifier services and solutions proliferate, an emerging problem becomes how to mitigate sources of bias that may be inherent in reasonably sized ground truth samples as well as the actual input texts that are to be classified by a text classifier trained with the ground truth samples.

One way to determine sources of bias in a ground truth text/class set is through careful, manual curation of the texts. The curator would essentially use human intelligence to discern the underlying linguistic patterns about the texts that would be considered sources of bias. Bias corresponds to a commonly occurring linguistic pattern in a class of text that is not intended to identify just that class of text. As the text patterns become clearer, the curator may also be able to express pattern matching rules, such as regular expressions, that are intended to characterize the text classes. For example, a regular expression for recognizing sentiment texts could be: "what (.)*is (.)*outlook (.)*".

There are significant disadvantages of extensive curation and rule-based characterization of text classes. These techniques rely on human intelligence to discern patterns, but there may be too great a cognitive load based on the size of the ground truth set. A goal of machine learning is to discern patterns in data sets that are too large for a human to process reliably. To put it plainly, the rules discovered may be incomplete at best or even actively harmful. For example, a human may notice that "descriptive" questions may often ask how to perform some task. If the curator creates a rule that associates "How (.)*perform (.)*" questions with the "descriptive" question class, then the rule would mischaracterize sentiment questions like "How will Singapore dollar perform in the near term?"

In essence, the disadvantages above are due to manual processes being applied to a ground truth, which may result in failure to discern correct or sufficiently intricate patterns.

However, to reiterate the problem, although the automatic machine-learned approach is capable of learning potentially more intricate linguistic patterns based on the whole of a large ground truth dataset, the challenge is around the source of bias that exists even in the large dataset. Therefore, there is a need in the art to mitigate the amount of effort required to produce a high accuracy text classifier.

An important observation is that many software solutions requiring classification are intended to process texts within a particular domain, such as an area of finance, law, or healthcare. A part of building the overall software solution is to build up sources of the domain terms that are important to users of the solution. For example, in a financial banking solution, there would be several sources of domain terms corresponding to different financial entity types like stocks, bonds, mutual funds, commodities, currencies, and companies as well as important people like company executives, fund managers, and country political leaders. Further domain terms can come from attributes of these entities, such as profit, revenue, and short sells, as well as from possible relationships between these entities, such as leadership and competitors.

A second observation is that because these domain terms are important to the users of the solution, they will tend to appear frequently in texts.

The illustrative embodiments provide mechanisms to pre-process the run-time input text of a text classifier to replace occurrences of domain terms found by a domain terms selector, resulting in a revised input text on which the machine learning model of the text classifier operates. In one embodiment, the machine learning model of the text classifier has been trained by a mechanism that pre-processes ground truth texts to replace occurrences of domain terms found by the domain terms selector and then uses the pre-processed ground truth to train the machine learning model of the text classifier.

For many of the illustrative embodiments, the advantage of this approach is that it can reduce or eliminate domain term referencing bias from run-time text classification. As a simple example, it is possible that text questions of class "factoid" may mostly contain terms about certain companies ("What is the gross revenue of XYZ Oil & Gas in 2014?"), rather than all companies, all financial entities, or all entities. Unintentionally, a text classifier may have been trained with ground truth data that resulted in learning to associate mentions of entities, or terms within those entities e.g., Oil & Gas), with the "factoid" class. Such a text classifier would be likely to misclassify other types of texts containing the same mentions, such as failing to classify a question like "How do I invest in XYZ Oil & Gas?" as a "descriptive" question. On the other hand, in the embodiment described in the preceding paragraph, the advantage of this approach is that it revises the input text prior to the operation of the machine learned model so that it is aligned with the pre-processing revisions of ground truth texts prior to training the machine learned model.

Another example of domain term referencing bias that may occur in a customer engagement pertains to distinguishing sentiment from non-sentiment questions in a financial domain. In that case, a source of bias may come from the fact that the ground truth questions classified as "sentiment" always include a financial entity mention, and "non-sentiment" questions did not always include a financial entity mention. The training may then cause the machine learning model of the question text classifier to learn that a financial entity mention was a sufficient condition for the "sentiment" classification. Once the mechanisms of the illustrative embodiments are applied, the bias is substantially reduced, as measured by a significant increase in classification accuracy.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
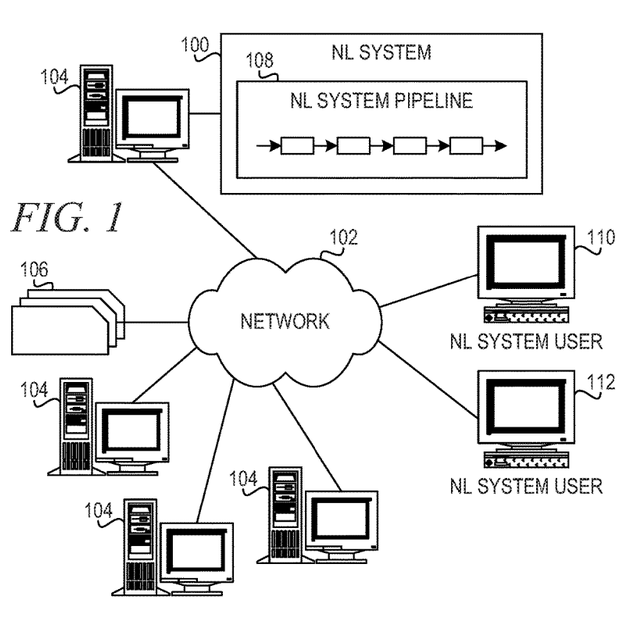
FIG. 1 depicts a schematic diagram of one illustrative embodiment of a natural language processing system in a computer network.
Figure 2:
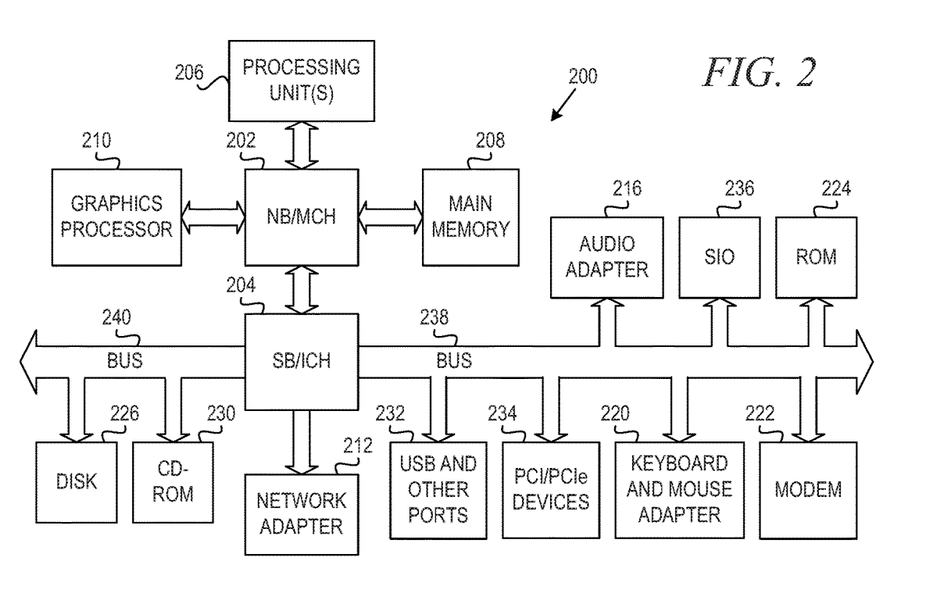
FIG. 2 is a block diagram of an example data processing system in which aspects of the illustrative embodiments are implemented.
Figure 3:
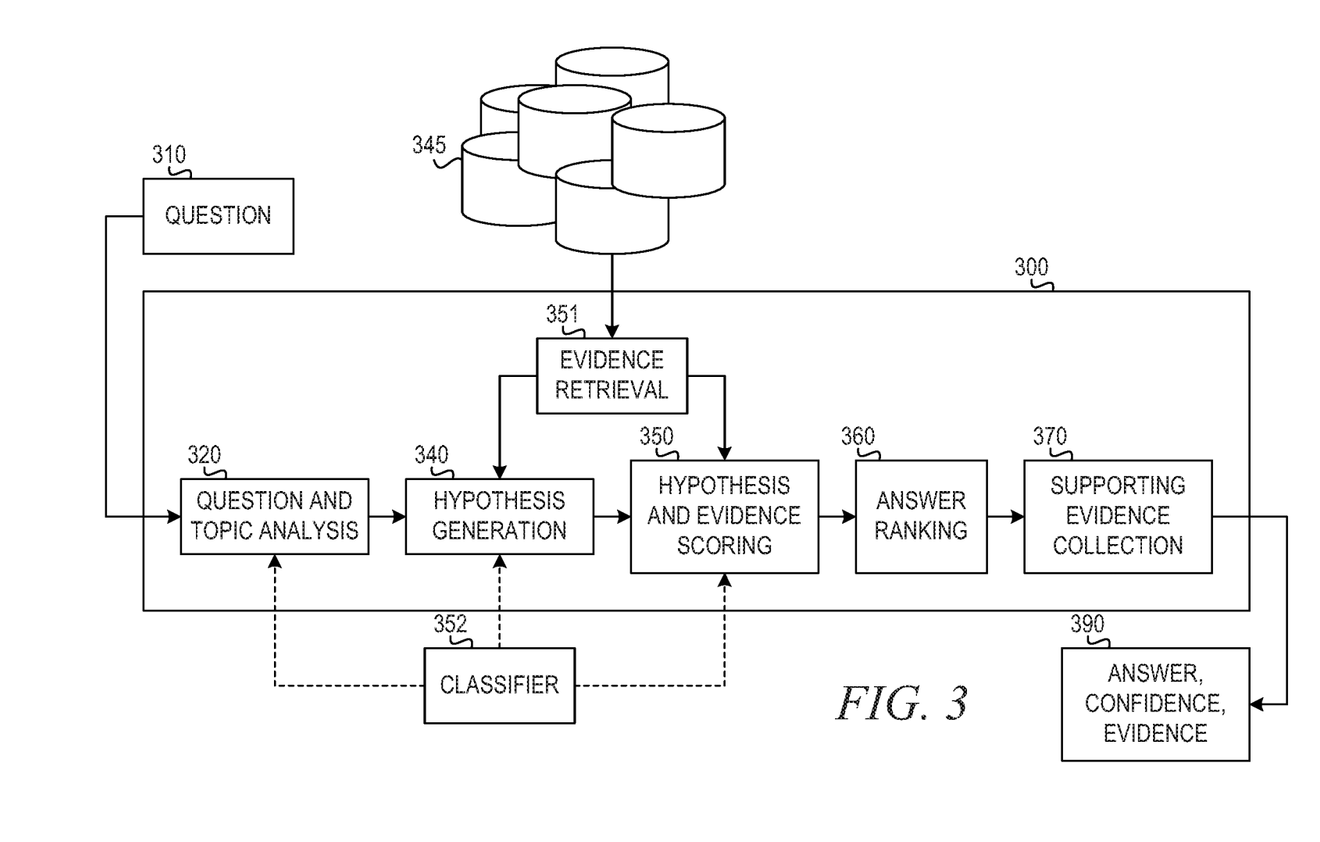
FIG. 3 illustrates a natural language processing system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example natural language (NL) processing system, such as a Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these NL processing mechanisms.

With respect to the example embodiment of a QA system, it is important to first have an understanding of how question answering in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of natural language processing mechanisms with which the illustrative embodiments are implemented. Many modifications to the example NL processing system shown in FIGS. 1-3 may be implemented in various embodiments of the present invention without departing from the spirit and scope of the present invention.

As an overview, a Question Answering system (QA system) is an artificial intelligence application, also referred to as a cognitive system, executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, sending the query to the QA system as a well-formed question which is then interpreted by the QA system and providing a response containing one or more answers to the question. Semantic content is content based on the relation between signifiers, such as words, phrases, signs, and symbols, and what they stand for, their denotation, or connotation. In other words, semantic content is content, that interprets an expression, such as by using Natural Language Processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g., comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information usable by the QA system to identify these question-and-answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

Because typical QA systems process individual user questions within an ocean of information, exact or near exact matches to wording of the question become commonplace. As data sets and corpora grow, the interaction between a question and similar or subtly different questions will become even more difficult to address.

To illustrate the point, a simple question, such as "Who is the President of the United States?" may find candidate answers in texts like "One may refer to the President of the United States as Mr. President," Which appears to fit the question. However, the answer "Mr. President" contains words that appear in the question and provides little information that the user did not already possess. This answer provides low informativity over the question, and although it does provide a relatively specific answer, a name would be even more specific. More complex questions may suffer from incomplete answers. For example, for the question "What commercial airplanes are capable of reaching 40,000 feet?" the information gain metric can easily determine that "787" is more specific than "airplane," and thus is a better answer, whereas longer answers can be demoted if they contain more common tokens. The answer "the new Boeing airliner" is longer and more informative than "airplane"; however, the shorter "787" or "Dreamliner" provides more specification because it is a rarely occurring word. Furthermore, if the question is asking about commercial aviation, the answer of "the new Boeing airliner" provides almost no insight. Therefore, the combination of informativity and specificity improves answer generation without taking either metric to an undesirable extreme.

FIG. 1 depicts a schematic diagram of one illustrative embodiment of a natural language processing system 100 in a computer network 102. One example of a question/answer generation, which may be used in conjunction with the principles described herein, is described in U.S. Patent Application Publication No. 2011/0125734, which is herein incorporated by reference in its entirety. The NL processing system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. In the depicted example, NL processing system 100 and network 102 enables question answering functionality for one or more QA system users via their respective computing devices 110-112. Other embodiments of the NL processing system 100 may be used with components, systems, sub-systems, and/or devices other than those that are depicted herein.

The NL processing system 100 is configured to implement an NL system pipeline 108 that receives inputs from various sources. For example, the NL processing system 100 receives input from the network 102, a corpus of electronic documents 106, NL system users, and/or other data and other possible sources of input. In one embodiment, some or all of the inputs to the NL processing system 100 are routed through the network 102. The various computing devices 104 on the network 102 include access points for content creators and NL system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. The network 102 includes local network connections and remote connections in various embodiments, such that the NL processing system 100 may operate in environments of any size, including local and global, e.g., the Internet.

In one embodiment, the content creator creates content in a document of the corpus of data 106 for use as part of a corpus of data with the NL processing system 100. The document includes any file, text, article, or source of data for use in the NL processing system 100. NL system users access the NL processing system 100 via a network connection or an Internet connection to the network 102, and input questions to the NL processing system 100 that are answered by the content in the corpus of data 106. In one embodiment, the questions are formed using natural language. The NL processing system 100 analyzes and interprets the question, and provides a response to the NL system user, e.g., NL processing system user 110, containing one or more answers to the question. In some embodiments, the NL processing system 100 provides a response to users in a ranked list of candidate answers while in other illustrative embodiments, the NL processing system 100 provides a single final answer or a combination of a final answer and ranked listing of other candidate answers.

The NL processing system 100 implements NL system pipeline 108, which comprises a plurality of stages for processing an input question and the corpus of data 106. The NL processing system pipeline 108 generates answers for the input question based on the processing of the input question and the corpus of data 106. The NI, processing system pipeline 108 will be described in greater detail hereafter with regard to FIG. 3.

In some illustrative embodiments, the NL processing system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question, which it then analyzes to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of scoring algorithms. The scores obtained from the various scoring algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located, in one illustrative embodiment, FIG. 2 represents a server computing device, such as a server 104, which implements an NL processing system 100 and NI, system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super 110 (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a natural language processing system pipeline for processing an input question in accordance with one illustrative embodiment. The natural language (NL) processing system pipeline of FIG. 3 may be implemented, for example, as NL system pipeline 108 of NL processing system 100 in FIG. 1. It should be appreciated that the stages of the NL processing system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The NL system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

In the depicted example, NL system pipeline 300 is implemented in a Question Answering (QA) system. The description that follows refers to the NL system pipeline or the NL system pipeline as a QA system; however, aspects of the illustrative embodiments may be applied to other NL processing systems, such as Web search engines that return semantic texts from a corpus of documents.

As shown in FIG. 3, the NL system pipeline 300 comprises a plurality of stages 310-390 through which the NL system operates to analyze an input question and generate a final response. In an initial question input stage, the NL system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the NL system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, etc. As referred to herein, a lexical answer type (LAT) is a word in, or a word inferred from, the input question that indicates the type of the answer, independent of assigning semantics to that word. For example, in the question "What maneuver was invented in the 1500 s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of attention deficit disorder with relatively few side effects?," the focus is "What drug" since if this phrase were replaced with the answer it would generate a true sentence, e.g., the answer "Adderall" can be used to replace the phrase "What drug" to generate the sentence "Adderall has been shown to relieve the symptoms of attention deficit disorder with relatively few side effects," The focus often, but not always, contains the LAT. On the other hand, in many cases it is not possible to infer a meaningful LAT from the focus.

In accordance with the illustrative embodiment, question and topic analysis stage 320 includes a classifier 352 for classifying the text of input question 310 to determine a question type. The question type may be, for example, sentiment, factoid, descriptive, reasoned, etc. A sentiment question asks about a view or attitude toward an entity, situation, or event. A factoid question asks for a small piece of information, such as a person, place, thing, time, etc. A descriptive question asks for a representation or account of a person, object, or event, such as a how-to. A reasoned question asks for a cause, explanation, or justification for an action or event. In this embodiment, classifier 352 uses a machine learning model to determine a question class based on features of input question 310.

Referring again to FIG. 3, the identified major elements of the question are then used during a hypothesis generation stage 340 to decompose the question into one or more search queries that are applied to the corpora of data/information 345 in order to generate one or more hypotheses. The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used in the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated.

The NL system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. This involves evidence retrieval 351, which retrieves passages from corpora 345. Hypothesis and evidence scoring phase 350 uses a plurality of scoring algorithms, each performing a separate type of analysis of the language of the input question and/or content of the corpus that provides evidence in support of, or not in support of, the hypothesis. Each scoring algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

For example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In accordance with an illustrative embodiment, hypothesis generation stage 340 and/or hypothesis and evidence scoring stage 350 may include a classifier 352 for classifying text for answer or evidence passages retrieved from corpora 345. In one embodiment, classifier 352, when employed in hypothesis generation stage 340 or hypothesis and evidence scoring stage 350, classifies each text as one of a set of text classes. The text classes may include, for example, sentiment, factoid, descriptive, reasoned, etc., as described above with respect to question texts.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares then against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence that supports the candidate answers from answer ranking phase 360. From the ranked listing of candidate answers in stage 360 and supporting evidence from supporting evidence collection stage 370, NL system pipeline 300 generates a final answer, confidence score, and evidence 380, or final set of candidate answers with confidence scores and supporting evidence, and outputs answer, confidence, and evidence 390 to the submitter of the original input question 310 via a graphical user interface or other mechanism for outputting information.

The illustrative embodiments apply to a QA solution in which a domain adaptation has occurred, resulting in a domain terms selector module capable of identifying at least one source of domain terms. A domain terms selector can use one of many techniques to identify domain terms, such as dictionary matching or the application of a rule-based annotator or a machine-learned annotator.

A further aspect of domain terms, whether identified by dictionary matching or annotation, is the indication of the type of the domain term, such as Person or Organization from the Hierarchical Unified Type Taxonomy (HUTT) type system. Domain term types can be used to distinguish different sources of domain terms. For example, those terms with a type that has an inheritance chain to HUTT's TopRelation are relation terms rather than entity terms. Furthermore, using an extension mechanism, entity type terms can be a source of domain terms that is distinguishable from entity terms, i.e., the literal occurrences of domain terms, such as Person or Location, in question text could be distinguishable from occurrences of domain terms that are of type Person or Location.

A further aspect of domain terms dictionaries is that they may be manually created and updated, or they may be obtained automatically by applying machine learned or rule-based annotators to a corpus of documents. Once the domain terms of various types are discovered and extracted from a corpus by such annotators, they are stored in a dictionary, after which they can be used in the same way as a manually updated dictionary.

Key components of the illustrative embodiments are a text classifier module that uses a trained machine learning model to classify a revised input text received from a text processor and a text processor that receives an original input text and produces the revised input text by applying a domain terms selector module to the original input text, to identify the domain terms in it, and then applying a domain terms replacer module to replace at least one identified domain term in it.

In a preferred embodiment, the trained machine learning model of the text classifier is also trained using a revised ground truth set of text/class pairs produced using the same text revision sequence as described above on an original ground truth set of text/class pairs by applying a domain terms selector module to the texts to identify the domain terms in them, and then applying a domain terms replacer module to replace at least one domain term from at least one of the texts.

In one example embodiment, the domain terms replacer module replaces each domain teen with an empty string, to remove the domain term from the text. However, other forms of replacement are also important, such as replacing the domain term substrings with descriptions of what they contain (e.g., entity, entity type, relation, negative relation, etc.). This latter variation can be important for helping to preserve more of the syntactic structure and the general pattern of the text. For example, once domain entity and relation terms are replaced with an empty string, "Who is?" could result from "Who is Marie Curie?" or "Who is France's leader?" However, by substituting domain term descriptions, the above texts become "Who is <entity>?" and "Who is <entity> <relation>?" If a text classifier were being trained to indicate various knowledge graph database queries to associate with texts, it would be impossible to tell from just "Who is?" whether to do a vertex lookup by name attribute or to do a vertex neighborhood operation filtered by edge type or neighborhood vertex type. By comparison, the latter two questions are clearly distinguishable and yet bias from any specific terms in the domain has still been eliminated.

In another example embodiment, a replacement method map determines which subsets of domain terms to replace or to not replace, and which ways to perform replacement. The replacement method map comprises a configurable list of domain term types and their assigned replacement methods. For example, in a financial industry solution, an adaptation may include financial entity terms that cover mentions of company stocks, country currencies, mutual funds, and bonds, as well as financial aspect terms that cover mentions of aspects of those financial entities, such as profit, revenue, earnings per share, and interest rate. Configuration entries can be used to indicate that the financial entities should be replaced with an empty string but financial aspect terms should not be replaced. In general, this configurable capability would enable a text classifier to learn fine grain text classes based on a subset of domain terms while still factoring out other domain terms that might be sources of bias. For example, in a question "What is the stock price of XYZ Corporation?", the "XYZ Corporation" is a removed financial entity term, and "stock price" is a financial aspect term that is not removed from texts. Similarly, in the text "What is the interest rate of the Euro?", the "Euro" is a financial entity term to be replaced, and "interest rate" is a financial aspect term that is not replaced in the texts. By configuring the system to replace the financial entities but not the financial aspects available in the domain adaptation, the text classifier could learn to distinguish stock price questions from interest rate questions, which could then be answered by invoking different services, such as a real-time stock quote service versus a daily currency exchange rate service.

Figure 4:
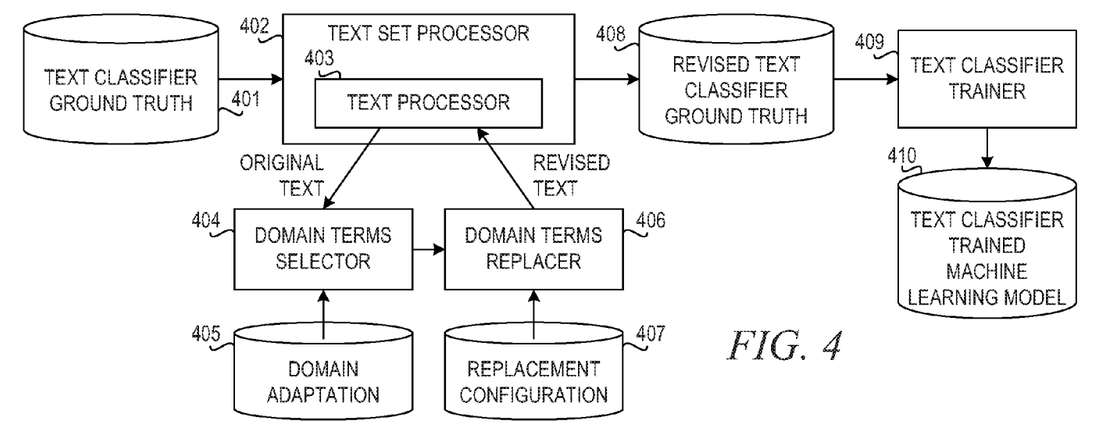
FIG. 4 is a block diagram depicting operation of a text classifier training mechanism in accordance with an illustrative embodiment.

FIG. 4 is a block diagram depicting operation of a text classifier training mechanism in accordance with an illustrative embodiment. The text classifier ground truth 401 is provided as input to text set processor module 402, which pre-processes the texts. For each text, text set processor module 402 invokes text processor module 403. Text processor 403 sends the original text to domain terms selector module 404.

Domain terms selector module 404 uses the domain adaptation 405 (e.g., entity dictionary, entity types, relation terms, etc.) to help identify domain terms in the original text. Domain terms replacer module 406 then replaces the identified domain terms according to methods in its replacement configuration 407. In one embodiment, replacement configuration 407 comprises a replacement method map in which each entry expresses a domain term match condition and a replacement method. A condition may match a domain term exactly, partially based on a regular expression, or indirectly via a synonym match or a match of the type of the domain term. The corresponding replacement method may be any of a number of possible replacement methods, including not replacing the domain term, replacing the domain term with the empty string, replacing the domain term with a canonical name for the domain term, or replacing the domain term with a text substring describing the domain term, such as its type if it is an entity or a substring describing whether it indicates a relation or the negation (absence) of a relation. For each identified domain term that matches a match condition, domain terms replacer module 406 revises the original text by applying the corresponding replacement method to the domain term within the original text. Domain terms replacer module 406 returns the revised text to the text processor module 403.

Once all texts have been processed, text set processor module 402 stores the resulting output to revised text classifier ground truth 408. Text classifier trainer module 409 uses revised text classifier ground truth 408 to train text classifier trained machine learning model 410.

Figure 5:
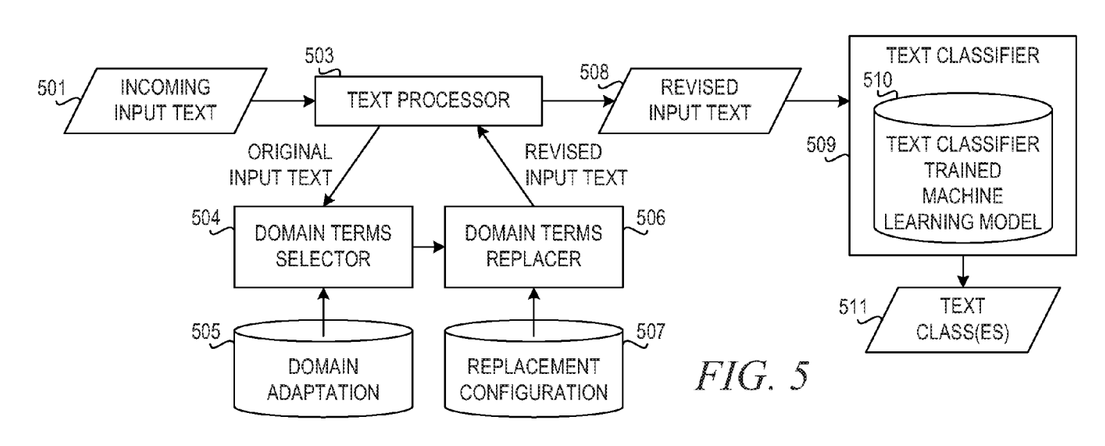
FIG. 5 is a block diagram depicting operation of a text classifier run-time mechanism in accordance with an illustrative embodiment.

FIG. 5 is a block diagram depicting operation of a text classifier run-time mechanism in accordance with an illustrative embodiment. Incoming input text 501 is provided as input to text processor module 503, which sends the original input text to domain terms selector module 504. Domain terms selector module 504 uses the domain adaptation 505 (e.g., entity dictionary, entity types, relation terms, etc.) to help identify domain terms in the original input text. Domain terms replacer module 506 then replaces the identified domain terms according to methods in its replacement configuration 507. In one embodiment, replacement configuration 507 comprises a replacement method map, the composition of which is described above in FIG. 4 block 407. For each identified domain term that matches a match condition in the replacement method map, domain terms replacer module 506 revises the original input text by applying the corresponding replacement method to the domain term within the original input text. Domain terms replacer module 506 returns the revised input text to the text processor module 503.

Text processor module 503 sends revised text 508 to text classifier 509 that contains and operates according to text classifier trained machine learning model 510. In one embodiment, the text classifier machine learning model 510 with which text classifier 509 has been configured is an instance of text classifier machine learning model 410 produced by the text classifier training mechanism described in FIG. 4. Text classifier 509 analyzes the revised text 508 to generate as output text class or classes 511. In one embodiment, text classes 511 comprises a list of text classes, each having an associated confidence score.

In an alternative embodiment, text classifier 509 may be configured to simply output only the highest confidence text class. Text classifier 509 may also be configured to output only text classes the confidences of which exceed a configured threshold. In response to text classifier 509 determining that no text class exceeds the threshold, text classifier 509 provides a response that indicates that it is unable to classify the incoming text 501.

In another embodiment, domain terms selector module 406, 506 uses various replacement configurations 407, 507 to generate and test a plurality of text classifier trained models 410, 510 and determines the accuracy of each. A mechanism of this embodiment then identifies the most accurate configuration. The mechanism may also provide a sense of the amount of bias being contributed by each configurable facet and how much interdependence there may be among the configurable facets.

In yet another example embodiment, various techniques may be used for identifying the domain terms in texts. These techniques may include dictionary comparison using a manually curated dictionary, direct application of domain annotators to texts, and dictionary comparison using dictionaries derived by applying domain annotators to a corpus.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate nays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement, the functions/acts specified in the flowchart and/or block diagram block or blocks.

Figure 6:
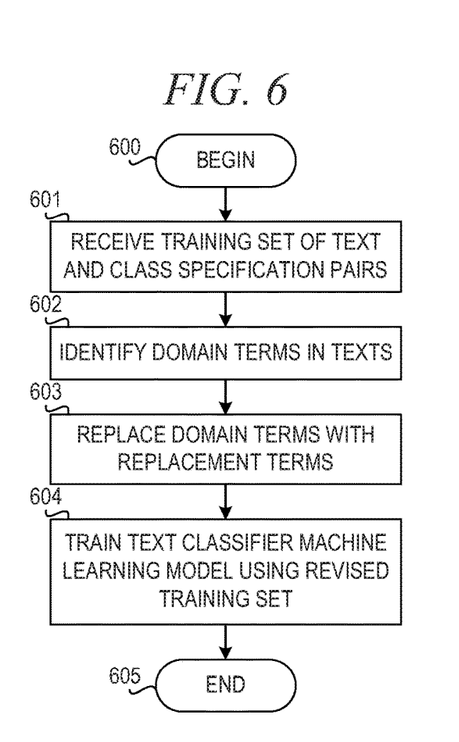
FIG. 6 is a flowchart illustrating operation of a text classifier trainer mechanism in accordance with an illustrative embodiment.

FIG. 6 is a flowchart illustrating operation of a text classifier trainer mechanism in accordance with an illustrative embodiment. Operation begins (block 600), and a text set processor module receives a ground truth training set of text and class specification pairs (block 601). A domain terms selector module identifies domain terms in texts from the text and class specification pairs (block 602). A domain terms replacer module replaces domain terms with replacement terms (block 603). In one embodiment, the replacement of domain terms is governed by a replacement method map as described in FIG. 4, block 406 and block 407. The result of the replacement of domain terms within texts of the ground truth training set is a revised ground truth training set (see FIG. 4, block 408). The text classifier trainer mechanism then trains a text classifier machine learning model using the revised ground truth training set (block 604). Thereafter, operation ends (block 605).

Figure 7:
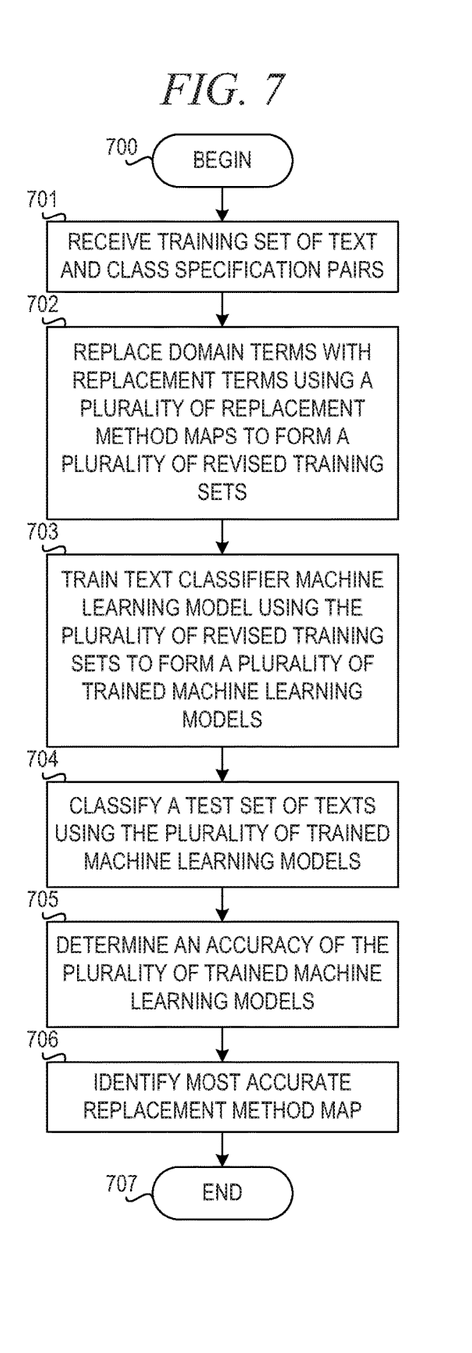
FIG. 7 is a flowchart illustrating operation of a mechanism for determining a replacement configuration in accordance with an illustrative embodiment.

FIG. 7 is a flowchart illustrating operation of a mechanism for determining a replacement configuration in accordance with an illustrative embodiment. Operation begins (block 700). The mechanism receives a ground truth training set of text and class specification pairs (block 701). The mechanism replaces domain terms with replacement terms using a plurality of replacement method maps to form a plurality of revised ground truth training sets (block 702). The mechanism trains a text classifier machine learning model for each of the plurality of revised ground truth training sets to form a plurality of trained machine learning models (block 703).

The mechanism classifies a labeled test set of texts, i.e. a test set of text and class specification pairs, using each of the plurality of trained machine learning models (block 704). The mechanism then determines an accuracy of the trained machine learning models on correctly classifying the texts of the test set (block 705). The mechanism then determines a most accurate replacement method map based on the results of classifying the test set (block 706). Then, operation ends (block 707).

Figure 8A:
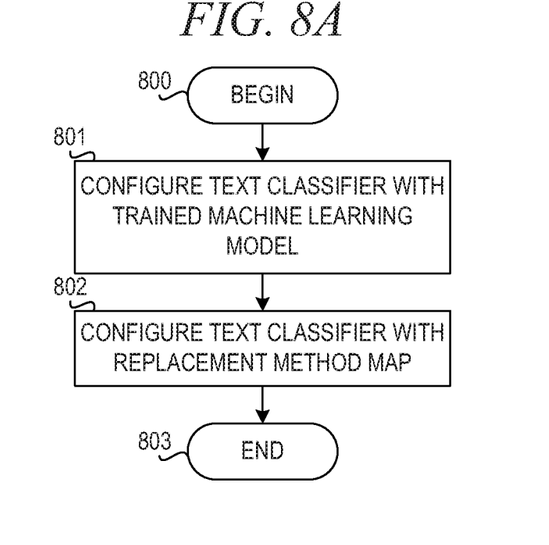
FIG. 8A is a flowchart illustrating configuration of a text classifier mechanism in accordance with an illustrative embodiment.

FIG. 8A is a flowchart illustrating configuration of a text classifier mechanism in accordance with an illustrative embodiment. Operation begins (block 800), and the mechanism configures a text classifier with a trained model (block 801). The mechanism then configures the text classifier with a replacement method map (block 802). Thereafter, operation ends (block 803).

Figure 8B:
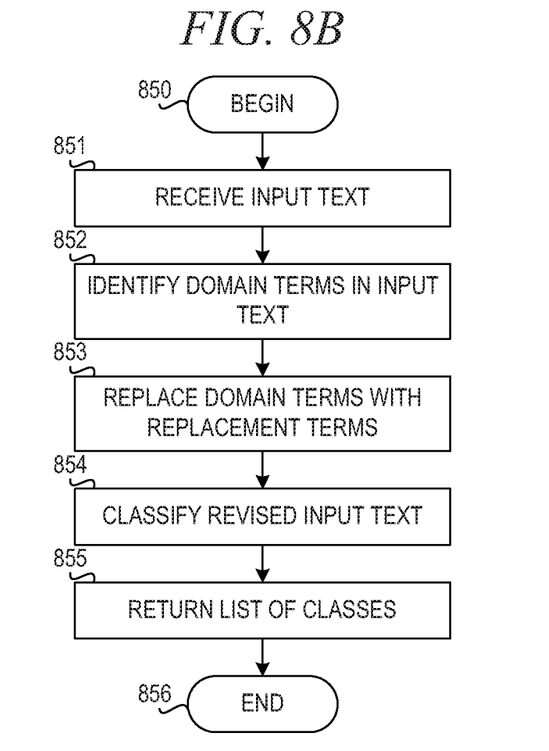
FIG. 8B is a flowchart illustrating operation of a text classifier mechanism in accordance with an illustrative embodiment.

FIG. 8B is a flowchart illustrating operation of a text classifier mechanism in accordance with an illustrative embodiment. Operation begins (block 850), and the mechanism receives an input text (block 851), and a domain terms selector module identifies domain terms in the input text (block 852). A domain terms replacer module then revises the input text by replacing domain terms with replacement terms (block 853). In one embodiment, the replacement of domain terms is governed by a replacement method map as described in FIG. 5, block 506 and block 507. The result of the replacement of domain terms within an input text is a revised input text (see FIG. 5, block 508). A text classifier, operating in accordance with a trained text classifier machine learning model, then classifies the revised input text (block 854). The text classifier returns a list of text classes (block 855). Thereafter, operation ends (block 856).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for text classification, the method comprising:
   receiving, by a domain terms selector component executing on a processor of the data processing system, an input text;
   identifying, by a domain terms selector component executing on a processor of the data processing system, at least one domain term in the input text;
   replacing, by a domain terms replacer component executing on a processor of the data processing system, the at least one identified domain term in the input text with a corresponding replacement term to form a revised input text, wherein replacing the identified domain term comprises, for each given identified domain term, determining a domain term type of the given identified domain term, and replacing the given identified domain term based on selecting a replacement method associated with the domain term type by a replacement method map; and
   classifying, by a text classifier component configured with a trained text classifier machine learning model, the revised input text to form a class determination.

2. The method of claim 1, wherein classifying the revised input text comprises analyzing the revised input text with the trained text classifier machine learning model and determining a list of classes and respective confidence scores.

3. The method of claim 2, wherein classifying the revised input text further comprises selecting a class from the list of classes having a highest confidence score and outputting the selected class as the class determination.

4. The method of claim 2, wherein classifying the revised input text further comprises selecting at least one class from the list of classes having a respective confidence score that exceeds a configured threshold and outputting the selected at least one class as the class determination.

5. The method of claim 2, wherein classifying the revised input text further comprises outputting an indication that the text classifier component is unable to classify the revised input text as the class determination in response to determining that none of the classes in the list of classes exceeds a configured threshold.

6. The method of claim 1, wherein the input text is a test question from a test set of question and answer pairs.

7. The method of claim 1, wherein for at least one identified domain term, the corresponding replacement term is a different domain term substring comprising a description of what the identified domain term contains.

8. The method of claim 7, wherein the different domain term substring identifies an entity canonical name, an entity type, a relation, or a negative relation.

9. The method of claim 1, wherein the replacement method is identified from a set consisting of: replacing the given identified domain term with an empty string, or replacing the given identified domain term with a different domain term substring.

10. The method of claim 1, wherein the trained text classifier machine learning model is formed by receiving a training set of text and class specification pairs to be used as a ground truth for training the text classifier machine learning model for the text classifier component; identifying at least one domain term in the texts of the training set; replacing the at least one identified domain term in the texts of the training set with a corresponding replacement term to form a revised set of text and class specification pairs; and training the text classifier machine learning model using the revised set to form the trained text classifier machine learning model.

11. A computer program product comprising a non-transitory computer readable storage medium having a computer readable program stored therein, wherein the computer readable program, when executed on a computing device, causes the computing device to implement a domain terms selector component, a domain terms replacer component, and a text classifier component, wherein the computer readable program causes the computing device to:
   receive, by the domain terms selector component executing on a processor of the data processing system, an input text;
   identify, by the domain terms selector component executing on a processor of the data processing system, at least one domain term in the input text;
   replace, by the domain terms replacer component, the at least one identified domain term in the input text with a corresponding replacement term to form a revised input text, wherein replacing the identified domain term comprises, for each given identified domain term, determining a domain term type of the given identified domain term, and replacing the given identified domain term based on selecting a replacement method associated with the domain term type by a replacement method map; and classify, by the text classifier component configured with a trained text classifier machine learning model and executing on a processor of the data processing system, the revised input text to form a class determination.

12. The computer program product of claim 11, wherein classifying the revised input text comprises analyzing the revised input text with the trained text classifier machine learning model and determining a list of classes and respective confidence scores.

13. The computer program product of claim 12, wherein classifying the revised input text further comprises selecting a class from the list of classes having a highest confidence score and outputting the selected class as the class determination.

14. The computer program product of claim 12, wherein classifying the revised input text further comprises selecting at least one class from the list of classes having a respective confidence score that exceeds a configured threshold and outputting the selected at least one class as the class determination.

15. The computer program product of claim 11, wherein the replacement method is identified from a set consisting of: replacing the given identified domain term with an empty string, or replacing the given identified domain term with a different domain term substring.

16. The computer program product of claim 11, wherein the trained text classifier machine learning model is formed by receiving a training set of text and class specification pairs to be used as a ground truth for training the text classifier machine learning model for the text classifier component; identifying at least one domain term in the texts of the training set; replacing the at least one identified domain term in the texts of the training set with a corresponding replacement term to form a revised set of text and class specification pairs; and training the text classifier machine learning model using the revised set to form the trained text classifier machine learning model.

17. An apparatus comprising:
a processor; and
a memory coupled to the processor, wherein the memory comprises instructions which, when executed by the processor, cause the processor to implement a domain terms selector component, a domain terms replacer component, and a text classifier component, wherein the instructions cause the processor to:

receive, by the domain terms selector component executing on a processor of the data processing system, an input text;

identify, by the domain terms selector component executing on a processor of the data processing system, at least one domain term in the input text;

replace, by the domain terms replacer component, the at least one identified domain term in the input text with a corresponding replacement term to form a revised input text, wherein replacing the identified domain term comprises, for each given identified domain term, determining a domain term type of the given identified domain term, and replacing the given identified domain term based on selecting a replacement method associated with the domain term type by a replacement method map; and classify, by the text classifier component configured with a trained text classifier machine learning model and executing on a processor of the data processing system, the revised input text to form a class determination.

18. The apparatus of claim 17, wherein classifying the revised input text comprises analyzing the revised input text with the trained text classifier machine learning model and determining a list of classes and respective confidence scores.

19. The apparatus of claim 18, wherein classifying the revised input text further comprises selecting a class from the list of classes having a highest confidence score and outputting the selected class as the class determination.

20. The apparatus of claim 17, wherein the replacement method is identified from a set consisting of: replacing the given identified domain term with an empty string, or replacing the given identified domain term with a different domain term substring.

* * * * *